United States Patent [19]

Hirata et al.

[11] 4,304,818
[45] Dec. 8, 1981

[54] INSULATION SYSTEM FOR WINDING OF ELECTRIC ROTATING MACHINES AND PROCESS OF PRODUCTION THEREOF

[75] Inventors: Hideyo Hirata, Ibaraki; Takeshi Hakamada, Hitachi; Misao Souma, Hitachi; Masao Matsui, Hitachi; Yoshiyuki Suda, Hitachi; Yoshiharu Karasawa, Hitachi; Toshikazu Narahara, Hitachi, all of Japan

[73] Assignee: Hitachi, Ltd., Tokyo, Japan

[21] Appl. No.: 103,571

[22] Filed: Dec. 14, 1979

Related U.S. Application Data

[63] Continuation-in-part of Ser. No. 506,337, Sep. 16, 1974, abandoned.

[30] Foreign Application Priority Data

Sep. 19, 1973 [JP] Japan ................................ 48/104993

[51] Int. Cl.³ .............................................. B05D 5/12
[52] U.S. Cl. ................................... 428/413; 427/104; 427/116; 427/379; 427/386; 428/377; 428/392; 428/395; 428/396; 428/411; 428/419; 428/422.8; 428/423.1; 428/423.5; 428/425.6; 428/426; 428/473.5; 428/474.4
[58] Field of Search ............... 428/377, 392, 395, 396, 428/411, 413, 419, 422.8, 423.1, 423.5, 425.6, 426, 473.5, 474.4; 427/104, 116, 379, 386

[56] References Cited

U.S. PATENT DOCUMENTS

3,793,236  2/1974  Ashida .

Primary Examiner—Marion McCamish
Attorney, Agent, or Firm—Craig and Antonelli

[57] ABSTRACT

An insulation system for winding of electric rotating machines having thermal resistance of class H or more and excellent adhesiveness between a conductor and an insulating layer and resistance to thermal stress can be produced by wrapping a plurality of layers of an insulating tape or sheet having thermal resistance of class H or more around a winding conductor, impregnating the thus treated winding conductor with a solventless varnish consisting essentially of 1 equivalent of an epoxy compound containing at least two vicinal epoxy groups, more than one equivalent of an organic polyisocyanate, and then heating the inpregnated winding conductor at a temperature above 60° C. for a time sufficient to form and cure a resin containing as recurring units at least two isocyanurate rings directly bonded to one another through the residue of the polyisocyanate and two oxazolidone rings directly bonded to each other through the residue of the polyepoxide in the presence of 0.01–10% by weight of a catalyst which forms the isocyanurate rings and oxazolidone rings based on the total amount of the polyepoxide and polyisocyanate.

23 Claims, 11 Drawing Figures

INSULATION SYSTEM FOR WINDING OF ELECTRIC ROTATING MACHINES AND PROCESS OF PRODUCTION THEREOF

CROSS-REFERENCE TO RELATED APPLICATIONS

This application is a continuation-in-part of Application Ser. No. 506,337 filed Sept. 16, 1974 now abandoned.

BACKGROUND OF THE INVENTION

The present invention relates to an insulation system for winding of electric rotating machines and a process for the production of such an insulated winding for electric rotating machines. More particularly, the invention pertains to an insulated winding for electric rotating machines having thermal resistance of class H or more obtained by impregnating and curing a novel thermosetting resin and a process for the production of such an insulated winding for electric rotating machines.

An improvement in the thermal resistance of a winding insulation is a conclusive factor for increasing the capacity of electric rotating machines and miniaturizing and weight saving of the machines. A tape or sheet of a polyimide, polyamideimide, aromatic polyamide or the like resin has heretofore been used as an insulating material having thermal resistance of class H (180° C.) for winding for such electric rotating machines. On the one hand, a polyimide resin varnish or a polyamideimide resin varnish is known as an insulating varnish of class H for impregnating insulating material but they are difficult to be a solventless varnish since they are condensation resin varnishes. Therefore, they are not suitable for winding for electric rotating machines in which the formation of voids is undesirable.

As a solventless varnish for impregnating insulating materials, an epoxy resin varnish has been widely used, but the epoxy resin has thermal resistance of class F (155° C.). When the resin is heated at a temperature of 180° C. or more, therefore, delamination occurs owing to heat deterioration between the insulating layers of the winding and particularly between the conductor and the insulating layer. Thereby thermal conduction is reduced and the temperature of the winding further increases. Also, corona starting voltage is reduced and dielectric breakdown is brought about.

Particularly, mechanical vibration is large in electric rotating machines. Therefore, said insulating layer is easy to peel from the conductor if the adhesive property of the varnish forming the insulating layer is poor. Since the machines are not immersed in an oil like a transformer, a corona is generated and dielectric breakdown occurs.

A silicone resin varnish is known as another varnish having excellent thermal resistance, but it is inferior in adhesiveness and is not suitable for such electric rotating machines.

SUMMARY OF THE INVENTION

An object of the present invention is to provide insulation system for winding of electric rotating machines having thermal resistance of class H or more.

Another object of the invention is to provide insulated winding for electric rotating machines having excellent adhesiveness between a conductor and an insulating layer.

A further object of the invention is to provide insulated windings for electric rotating machines having resistance to thermal stress.

Other objects and advantages of the invention will be apparent from the following description.

DETAILED DESCRIPTION OF THE INVENTION

According to the present invention, insulated winding for electric rotating machines can be produced by wrapping a plurality of layers of a sheet-form insulating material of glass fibers, a polyimide, polyamideimide or aromatic polyamide around a winding conductor for electric rotating machines, impregnating the layers with a solventless varnish comprising a polyepoxide, an organic polyisocyanate, and then curing the varnish in the presence of a catalyst for forming isocyanurate rings and oxazolidone rings.

The detailed composition, preparation and properties of the above-mentioned thermosetting resin are described in U.S. Patent Application Ser. No. 418,905, filed Nov. 26, 1973, now abandoned.

The term "electric rotating machines" used herein means generators and motors having an allowable temperature of 180° C. or more. As an insulating tape or sheet for a winding conductor for such electric rotating machines, a polyimide (KAPTON ® manufactured by E. I. du Pont de Nemours & Co. in U.S.A.), an aromatic polyamide (NOMEX ® manufactured by E. I. du Pont de Nemours & Co. in U.S.A.), a polyamideimide (PAIFRON ® manufactured by Hitachi Chemical Co., Ltd. in Japan), etc. are suitable. However, another class H insulating material such as a glass cloth tape or a mica tape may be used if necessary.

The above-mentioned impregnating varnish used in the present invention yields on curing a thermosetting resin having recurring units of at least two isocyanurate rings directly bonded to one another through residue of the polyisocyanate and two oxazolidone rings directly bonded to each other through residue of the polyepoxide represented by the formula (I), wherein R is a residue of the polyisocyanate, R' is a residue of the polyepoxide, p is an integer of at least 2, and m and r are integers of at least 1.

U.S. Pat. No. 3,793,236, titled "OXAZOLIDONE-MODIFIED ISOCYANURATE RESINS" discloses resins which are produced by preparing isocyanate group terminated oxazolidones represented by the following formula, wherein $R_1$ is a residue of an organic polyisocyanate and $R_2$ is a residue of a polyepoxide, and trimerizing the resulting oxazolidones in the presence of a trimerization catalyst to form oxazolidone-modified isocyanurate polymers.

The feature of the oxazolidone-modified isocyanurate polymers in the U.S. Patent is in that one isocyanurate ring is inserted between one group of oxazolidone rings and the other group of oxazolidone rings. This is an outstanding point to distinguish the cured varnish used in the present invention from the polymers disclosed in the U.S. Patent. In the cured varnish used in the present invention there are at least two isocyanurate rings directly connected to each other through a residue of an organic polyisocyanate. By virtue of the difference in their chemical structure, they show different properties shown below.

In order to show the difference between the resin used in the present invention and that obtained from a polyoxazolidone prepolymer according to U.S. Pat. No. 3,793,236 (Ashida et al.), a series of comparative tests were carried out and the results and conclusion as hereinafter set forth were obtained.

1. Experiment:
(1) Starting materials:

| Name of starting material | Manufacturer | Equivalent (average) |
|---|---|---|
| Epon 828 (Bisphenol A-epichlorohydrin adduct) | Shell Chemical Co. | 189 |
| Isonate 143 L (Liquid diisocyanate) | The Upjohn Co. | 144 |
| LiCl (Lithium chloride) | Wako Pure Chemical Industries, Ltd. (Japan) | MW: 42.4 |
| N-MM (N-Methylmorpholine) (Catalyst for curing) | Wako Pure Chemical Industries, Ltd. (Japan) | MW: 101.2 |

Note: As starting materials, the same materials as those used in U.S. Pat. No. 3,793,236 were used.

(2) Preparation of an isocyanate-terminated polyoxazolidone prepolymers in accordance with the same manner as shown in Example 6 of U.S. Pat. No. 3,793,236:

To a three-necked flask having a cooling condenser, a stirrer and thermometer, were charged starting materials as shown in Table 1, and the mixture was allowed to react at 150° C. for one hour with stirring. The reaction product was a brownish clear viscous resin.

TABLE 1

| Starting material | Components of starting materials of prepolymer | |
|---|---|---|
| | Prepolymer A | Prepolymer B |
| Isonate 143 L | 2.0 eq. (288 g) | 2.0 eq. (288 g) |
| Epon 828 | 0.34 eq. (64.2 g)* | 0.67 eq. (127 g) |
| LiCl** | 2.0 m mole (0.084 g) | 2.0 m mole (0.084 g) |
| Ratio of equivalent (Isonate | 5.88 | 3.00 |

TABLE 1-continued

| Starting material | Components of starting materials of prepolymer | |
|---|---|---|
| | Prepolymer A | Prepolymer B |
| 143 L/Epon 828) | | |

*: In U.S. Pat. No. 3,793,236, it is shown that 0.17 eq. corresponds to 14.4 g, but this is incorrect and it is correct that 0.17 eq. corresponds to 32.1 g.
**: Dried in an oven at 150° C. for 24 hours in advance.

(3) Curing of resin:

In accordance with the same manner as shown in the specification of the present application, the compositions shown in Tables 2 and 3 were cured under a condition of 80° C./5 hours plus 150° C./15 hours, respectively.

TABLE 2

| Starting material | Composition of U.S. Pat. No. 3,793,236 (Ashida et al.) | |
|---|---|---|
| | Composition I | Composition II |
| Prepolymer A | 352.2 g | — |
| Prepolymer B | — | 415.0 g |
| N-MM (catalyst for curing) | 1.06 g (0.3 wt %) | 1.25 g (0.3 wt %) |

TABLE 3

| Starting material | Composition of the present invention | |
|---|---|---|
| | Composition III | Composition IV |
| Isonate 143 L | 2.0 eq. (288 g) | 2.0 eq. (288 g) |
| Epon 828 | 0.34 eq. (64.2 g) | 0.67 eq. (127 g) |
| N-MM (catalyst for curing) | 1.06 g (0.3 wt %) | 1.25 g (0.3 wt %) |
| Ratio of equivalent (Isonate 143 L/Epon 828) | 5.88 | 3.00 |

(4) Characteristics of the cured products:

Test pieces were prepared from the cured products obtained as above and subjected to the determination of tensile strength, elongation and thermal deterioration in accordance with the same manner as shown in the specification of U.S. Patent Application Ser. No. 418,905, respectively. The results obtained are as shown in Table 4.

TABLE 4

| Characteristics | | Composition | | | |
|---|---|---|---|---|---|
| | | U.S. Pat. No. 3,793,236 | | Present Invention | |
| | | I | II | III | IV |
| Initial stage (measured at 225° C. | Tensile strength (kg/cm$^2$) | 548 | 350 | 600 | 480 |
| | Elongation (%) | 3.0 | 3.6 | 3.5 | 4.0 |
| After 15 days deterioration at 240° C. (measured at 225° C. | Tensile strength (kg/cm$^2$) | 150 | 80 | 520 | 450 |
| | Elongation (%) | 1.0 | 1.5 | 2.5 | 3.0 |
| | Loss of weight (%) | 5.1 | 6.2 | 3.8 | 4.0 |

From the results obtained shown in Table 4, it is apparent that the resins used in the present invention show excellent characteristics as compared with those obtained according to the U.S. Patent. The resins of the latter are remarkably lowered, especially, in the characteristics after thermal deterioration. This fact is considered to be caused by the difference in the chemical structure of the both resins owing to the difference between the methods for producing them.

Infrared spectrum analysis of the chemical structure of the resins used in the present invention shows that trimerization of a polyisocyanate takes place at first in the presence of a catalyst for forming isocyanurate rings and oxazolidone rings and then the reaction between the polymer of polyisocyanate and a polyepoxide takes place to form oxazolidone rings. Since the equivalent ratio of the polyisocyanate to the polyepoxide is more than one and the trimerization reaction precedes the oxazolidone forming reaction, at least two isocyanurate rings are directly connected to each other through one residual group of the polyisocyanate. FIGS. 6a to 6f are infrared spectra showing the reaction mechanism.

In this analysis, the following reactions were conducted. To a 200 ml 4-necked flask equipped with a stirrer, thermometer, condenser, and calcium chloride drying tube, was added 100.0 ml of phenyl-glycidyl ether. The flask was filled with an atmosphere of dry argon. The flask was immersed in a constant temperature (150° C.) bath held within a temperature control of ±0.05° C. Phenylisocyanate 11.73 g and 1-cyanoethyl-2-phenyl imidazole 0.237 g were placed in the flask. Immediately thereafter, a 0.500 ml hole pipet was inserted into the flask and 0.500 ml of the mixture was delivered as a sample to a 10.00 ml volumetric flask. Then, the sample was diluted to 10.00 ml with o-dichlorobenzene. The infrared spectrum of the sample was indicated as zero time. Each 0.500 ml of the solution was pipetted out at appropriate intervals of time.

Figure 6A:
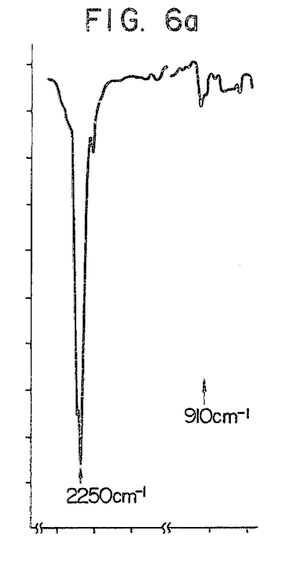
FIGS. 6a–6f are infrared spectra showing structures of a resin in the course of the production thereof.

The reactions were monitored by observing the disappearance of the infrared absorptions due to isocyanate groups at 2250 cm$^{-1}$ and due to epoxy groups at 910 cm$^{-1}$, and the appearance of the infrared absorptions due to isocyanurate rings at 1710 cm$^{-1}$ and due to oxazolidone rings at 1760 cm$^{-1}$ by means of Hitachi 215 infrared spectrophotometer. These results are shown in FIGS. 6a (Reaction time: zero minute), 6b (20 minutes), 6c (40 minutes), 6d (60 minutes), 6e (80 minutes) and 6f (100 minutes).

Figure 6B:
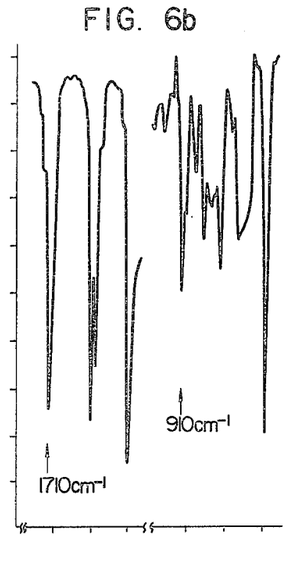
Figure 6C:
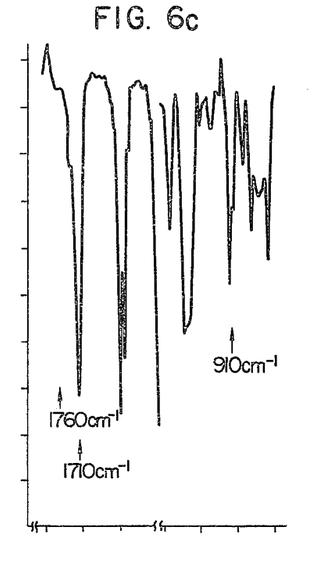
Figure 6D:
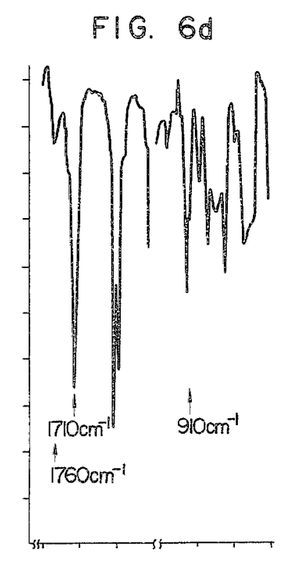
Figure 6E:
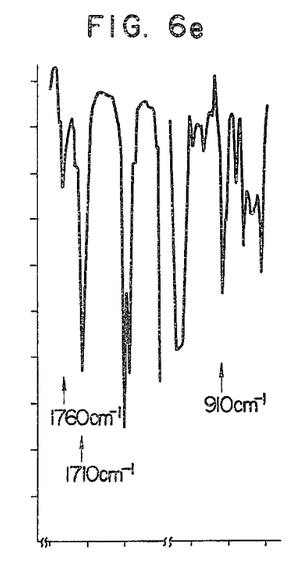
Figure 6F:
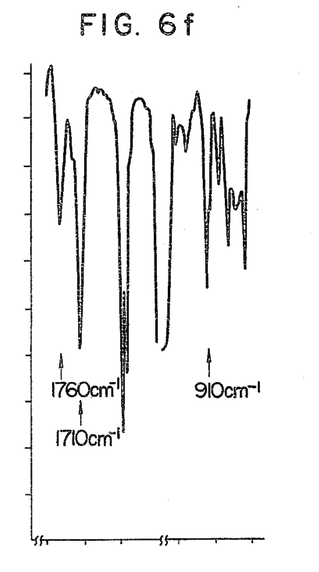

According to FIGS. 6a to 6f, it is apparent that at first the sample exhibits the charactersitics due to isocyanate and epoxy groups (FIG. 6a) and then the characteristics due to isocyanurate and epoxy groups (FIG. 6b). With the progress of the reaction, characteristics due to oxazolidone rings are observed (FIGS. 6c to 6f) at 1760 cm$^{-1}$. The longer the reaction time, the stronger the absorption due to oxazolidone rings becomes and the weaker the absorption due to epoxy rings becomes.

It should be noted that the sample used in analysis at zero time was diluted two times thinner than the other samples, so as to show the full absorption peak due to isocyanate groups.

The winding insulated with said thermosetting resin are superior as winding insulation for electric rotating machines to the winding insulated with a prior art epoxy resin since the thermosetting resin used in the present invention shows good adhesiveness for a conductor such as copper or aluminum.

In order to obtain thermal resistance of class H or more and strong adhesiveness in the above-mentioned winding insulation, more than one equivalent of an organic polyisocyanate is blended with 1 equivalent of a polyfunctional epoxy compound. The larger the equivalent ratio of the polyisocyanate to the polyepoxide, the better the heat resistance of the cured resin is obtained. An amount of the polyepoxide is such that oxazolidone rings are introduced in the cured resins. From the view point of mechanical properties of the cured resin, more than 2 equivalents of the polyisocyanate per one equivalent of the polyepoxide is used. When the amount of polyisocyanate exceeds 15, there is a tendency that the cured resin becomes hard. The thus obtained hard resin can be used as it is in cases wherein flexibility is not required.

In general, the curing is carried out by heating at a temperature of 130° C. or less and preferably above about 60° C., for 5–15 hours and then heating at a temperature of 150° C. or more for 5–15 hours. At a temperature of 130° C. or less, isocyanurate rings are formed mainly by the trimerization of the polyisocyanate. By heating the trimer having the isocyanurate rings and the polyepoxy compound at a temperature of 150° C. or more, oxazolidone rings are formed and cross-linking and curing occur. If such an insulating varnish which yields a thermosetting resin by heating is used, said tape or sheet insulating material and the winding conductor are tightly bonded so that delamination may not occur even at high temperatures. In order to obtain an better insulation having thermal resistance of class H or more, it is preferable to blend 5 to 10 equivalents of an isocyanate with 1 equivalent of an epoxide.

The polyfunctional epoxides or polyepoxides used in the present invention have at least two vicinal epoxy groups or 1,2-epoxy groups in the molecule. There can be exemplified bifunctional epoxides such as, for example, diglycidylether of bisphenol A, butadiene diepoxide, 3,4-epoxycyclohexylmethyl-(3,4-epoxy)-cyclohexane carboxylate, vinylcyclohexene dioxide, 4,4'-di(1,2-epoxyethyl)diphenylether, 4,4'-di(1,2-epoxyethyl)-biphenyl, 2,2-bis(3,4-epoxycyclohexyl)propane, diglycidylether of resorcinol, diglycidylether of phloroglucinol, diglycidylether of methylphloroglucinol, bis-(2,3-epoxycyclopentyl)ether, 2-(3,4-epoxy)cyclohexane-5,5-spiro(3,4-epoxy)-cyclohexane-m-dioxane, bis(3,4-epoxy-6-methylcyclohexyl)adipate, N,N'-m-phenylenebis-(4,5-epoxy-1,2-cyclohexanedicarboxyimide) and the like; and tri- or more functional epoxy compounds such as triglycidylether of paraminophenol, polyallylglycidylether, 1,3,5-tri(1,2-epoxyethyl)benzene, 2,2',4,4'-tetraglycidoxybenzophenone, tetraglycidoxy-tetraphenylethane, polyglycidylether of phenol-formaldehyde novolac, triglycidylether of glycerol, triglycidylether of trimethylolpropane and the like. With respect to the other epoxy compounds, a book entitled "Epoxy Resins" (American Chemical Society, 1970) written by Henry Lee and a book entitled "Handbook of Epoxy Resin" (McGraw Hill Book Co., 1967) written by Henry Lee and K. Neville contain the descriptions of the resins.

Among the aforesaid polyfunctional epoxides, diglycidylether of bisphenol A and polyglycidylether of phenol-formaldehyde novolac have a particular good reactivity. Therefore, they are useful compounds. Further, halides of these compounds can be used, too. In order to obtain a low viscosity varnish which is particularly important for the impregnating varnish, diepoxides are employed.

Further, as organic polyfunctional isocyanates or polyisocyanates, there can be used bifunctional isocyanates, such as, for example, methane diisocyanate, butane-1,1-diisocyanate, ethane-1,2-diisocyanate, butane-1,2-diisocyanate, transvinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethyl-silane diisocyanate, diphenylsilane diisocyanate, ω,ω'-1,3-dimethylbenzene diisocyanate, ω,ω'-1,4-dimethylbenzene diisocyanate, ω,ω'-1,3-dimethylcyclohexane diisocyanate, ω,ω'-1,4-dimethylcyclohexane diisocyante, ω,ω'-1,4-dimethylbenzene diisocyanate, ω,ω'-1,4-dimethylnaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyante, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'diisocyanate, 2,4-toluene diisocyanate and the like; and trifunctional or more isocyanates, such as, for example, polymethylenepolyphenylisocyanate, triphenylmethanetriisocyanate, tris(4-phenylisocyanatethiophosphate), 3,3',4,4'-diphenylmethanetetraisocyanate and the like. Further, compounds obtained by masking isocyanic radicals of the aforesaid isocyanates with phenol, cresol and the like can be used, too. The dimers and trimers of these isocyanates are usable, too. Among these isocyanates, 4,4'-diphenylmethane diisocyanate, 2,4-toluene diisocyanate are preferable and useful. The aforesaid epoxides and isocyanates are each used solely or in combination with one another. In order to obtain a low viscosity varnish, diisocyanates are particularly useful.

A catalyst displays an important role for obtaining the heat resistant insulating system of the present invention. The catalyst is used to form isocyanurate bonds and oxazolidone bonds at the time of curing. Such a catalyst as above includes morpholine derivatives, such as, for example, N-dodecylmorpholine, butylene dimorpholine, hexamethylene dimorpholine, cyanoethyl morpholine, triazinoethyl morpholine, N-methyl morpholine, N-ethyl morpholine and the like. Further, there are imidazole derivatives as a catalyst, such as, for example, 2-methylimidazole, 2-ethylimidazole, 2-ethyl-4-methylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 2,4-diamino-6-(2'-methylimidazolyl-1'-)-ethyl-s-triazine, 2,4-diamino-6-(2'-ethylimidazolyl-1'-)-ethyl-s-triazine, 2,4-diamino-6-(2'-undecylimidazolyl-1'-)-ethyl-s-triazine and the like. Among the aforesaid catalysts, imidazole derivatives are particularly effective in manufacturing windings for rotating machines.

The aforesaid heterocycle forming catalysts are used within a range of 0.01 to 10% by weight, preferably 0.1 to 2% by weight, based on a mixture of said polyfunctional epoxide and polyfunctional isocyanate.

As a method for impregnating a winding wrapped with said tape or sheet with a blend of said resin formulation comprising a polyfunctional epoxy compound and a polyfunctional isocyanate compound, a method which comprises previously impregnating only the catalyst dissolved in an organic solvent and then impregnating the resin component is preferable. In the method, the catalyst has no adverse effect on the pot life of the resin varnish in a storage tank and there is no fear of gelation of the varnish in the tank at room temperature.

The above-mentioned method of impregnating windings with the varnish is carried out under reduced pressure. In this case, the viscosity of the impregnating varnish is preferably 7 poises or less, and more preferably 2 poises or less, at the impregnation temperature. If the viscosity exceeds 7 poises, it is feared that sufficient impregnation cannot be effected.

The following examples illustrate the present invention.

EXAMPLE 1

An aromatic polyamide (NOMEX) tape having a thickness of 0.075 mm was wound around a bar-form conductor having a section of 7.4×14.4 mm and a length of 550 mm, obtained by piling six flat type copper wires, four times at half lap to wrap the bar-form conductor. Further, a glass cloth tape having a thickness of 0.18 mm was wound around it one time at half lap to prepare a model winding.

The model winding was immersed in a 1% solution of 2-ethyl-4-methylimidazole, which is a catalyst forming isocyanurate rings and oxazolidone rings, in methanol to impregnate said solution, air-dried at room temperature, and dried at 40° C. and 0.1 mmHg for 5 hours. A resin component consisting of 1 equivalent of diepoxide DER-332 (a bisphenol A epoxy resin manufactured by Dow Chemical Co. in U.S.A., epoxy equivalent 178) and 2 equivalents of diisocyanate MDI (4,4'-diphenylmethane diisocyanate) was then introduced under reduced pressure. The impregnation was carried out at 40° C. and 3 mmHg. Further, a pressure of 5 kg/cm$^2$ was applied for 5 hours to remove voids. The above-mentioned varnish-impregnated model winding was wrapped by a polytetrafluoroethylene tape and then cured at 70° C. for 15 hours and at 180° C. for 15 hours so that the impregnated varnish might not flow out.

Figure 1:
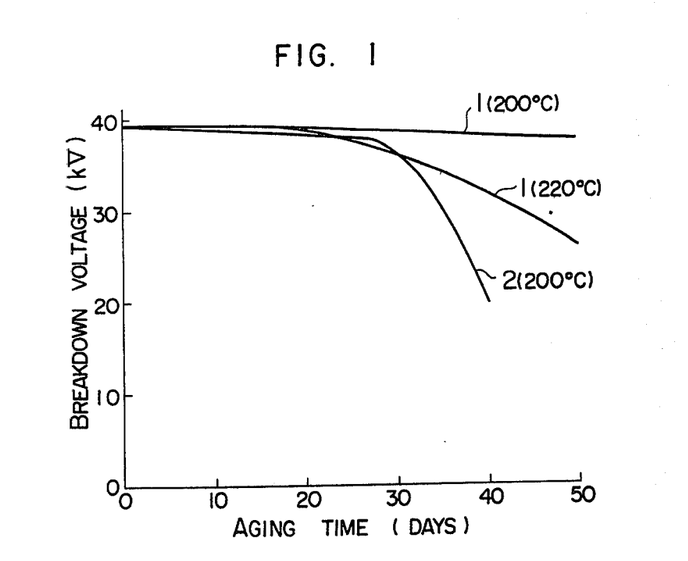
FIG. 1 shows a change of the breakdown voltage of a model bar coil after deterioration test.

A change in the breakdown voltage (BDV) of the said model winding after thermal aging is shown in FIG. 1.

For comparison, a change in the breakdown voltage of the model winding obtained by impregnating with a prior art cycloaliphatic epoxy resin-acid anhydride curing system resin varnish is also shown.

As is clear from FIG. 1, the model winding according to the present invention (1) is smaller in the reduction of BDV and higher in thermal resistance than the model winding according to the prior art process (2).

2Ethyl-4-methylimidazole as a catalyst forming isocyanurate rings and oxazolidone rings was directly added to the resin varnish, and the insulating layer of the winding was impregnated with the resin varnish. A result similar to the curve (1) in FIG. 1 was obtained, but the remaining resin varnish in the impregnation tank began to gel after about 4 hours and became unsuitable for the subsequent impregnation of the winding.

EXAMPLE 2

Figure 2:
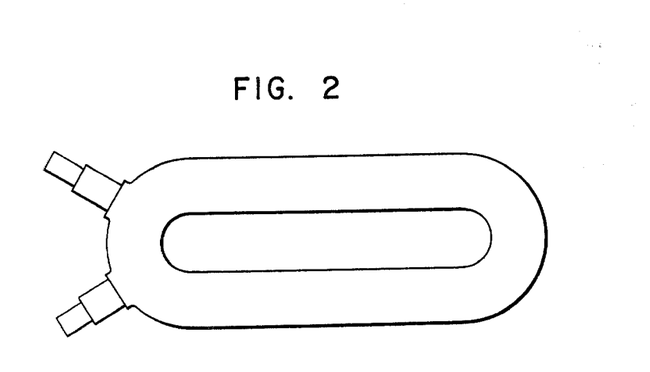
FIG. 2 is a plan of a field coil for a direct current motor.

A model coil having a shape similar to that of the field coil for a direct current motor as shown in FIG. 2 was prepared. As an insulation of the model coil, a NOMEX tape having a thickness of 0.075 mm was wound four times at half lap. Further, a glass cloth tape having a thickness of 0.18 mm was wound one time at half lap. The size of the coil including the insulating layer was 105 mm×300 mm×60 mm and the sectional size of the conductor was 36 mm×58 mm.

From the model coil, four insulated model coils according to the present invention and four insulated model coils with a piror art cycloaliphatic epoxy resin-acid anhydride curing system resin varnish were prepared in the same manner as in Example 1. Heat cycle test was carried out by electric current heating to compare the resistance to delamination between the conductor and the insulating layer in these insulated model coils.

Figure 3:
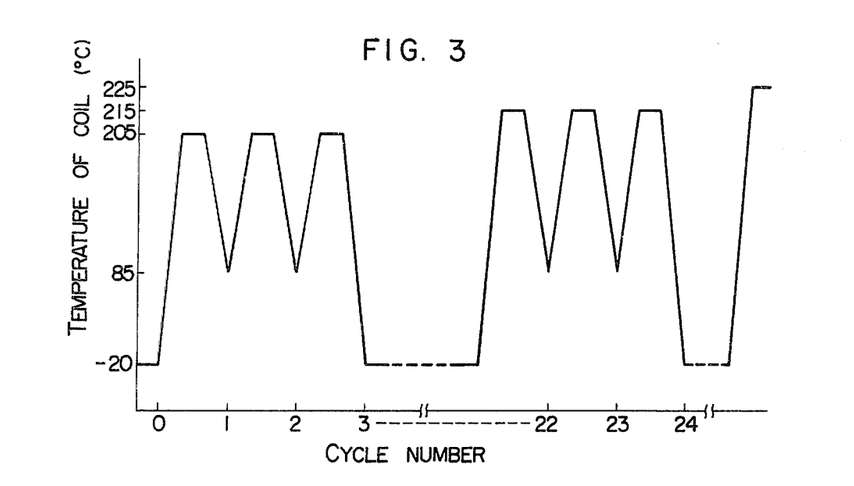
FIG. 3 shows the schedule of heat cycles in class H heat cycle test.

As shown in FIG. 3, the heat cycle test of class H was carried out as follows:

As one cycle, 205° C, 30 minutes→85° C.→205° C., 30 minutes was repeated three times and then cooling at −20° C. for 4 hours. Such a cycle was repeated 21 times. The heating temperature was increased to 215° C. and 9 cycle were carried out in the same manner as described above. Further, the heating temperature was increased to 225° C. and 9 cycles were carried out in the same manner as described above. Thus, 39 heat cycles in all were carried out.

The delamination between the conductor and the insulating layer was judged by striking the surface of the insulating layer with a small hammer and hearing the sound. This method permitted easy and correct judgement without requiring any particular skill.

As a result of the above-mentioned test, in the case of the prior art insulated model coils, two delaminated substantially over the whole surface and the other two delaminated on about 50% of the whole surface in the 15th heat cycle. On the other hand, in the case of the insulated model coils according to the present invention, only one delaminated on 15% of the whole surface in the 30th cycle and the other three did not delaminate even after 39 cycles. Of course, insulation was all right.

EXAMPLE 3

Figure 4:
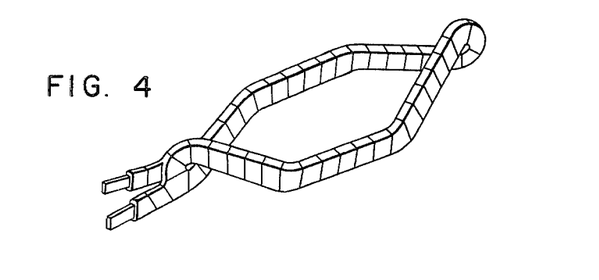
FIG. 4 is a rough sketch of an armature coil for a direct current motor.

A prior art epoxy resin varnish was applied to an armature coil for a direct current motor as shown in FIG. 4. When the slot length was about 600 mm or more, it was impossible to subject the coil and an iron core to integral impregnation since the coil insulating layer broke down owing to the stress produced by a difference in thermal expansion caused by heat cycles between the coil insulating layer and the iron core.

On the other hand, in the case of the varnish used in the present invention, integral impregnation was possible even if the slot length was 800–900 mm.

A model bar coil having a length of about 1,000 mm was prepared and insulated in the same manner as in Example 1. The insulated model bar coil was inserted into a slot having a width of 20 mm, a depth of 36 mm and a length of 850 mm and then impregnated with the resin varnish of Example 1 to prepare an armature model. The impregnation and curing conditions were the same as in Example 1 except that the catalyst was directly added to the resin component in an amount of 1% by weight.

For the armature model, 500 heat cycles of 60° C.→180° C. were carried out, heating at 220° C. for 10 days was effected, and then 500 heat cycles of 60° C.→180° C. were again carried out, and its BDV was measured. As a result, the armature model according to the present invention showed only a slight reduction in BDV but were all right. On the other hand, breakdown occurred in the case of armature model prepared with the prior art cycloaliphatic epoxy resin-acid anydride curing system varnish.

As described above in detail, the insulated winding for electric rotating machines according to the present invention has excellent thermal resistance and adhesiveness which have not been obtained, and can be used as an insulated winding having thermal resistance of class H or class C.

As already described, the pot life of the impregnating varnish used in the present invention is short when a catalyst which forms isocyanurate rings and oxazolidone rings is added. Therefore, it is desirable to previously impregnate layers of the tape or sheet wound around a conductor with this catalyst alone. The impregnation is carried out by dissolving a required amount of the catalyst in an organic solvent. In this case, part of the epoxy resin may be used as a binder. As the solvent, methanol, acetone, toluene, benzene, ethyl alcohol, methyl ethyl ketone, dimethylformamide, etc. may be used. It is desirable that the amount of the catalyst used is 0.1–2% by weight based on the weight of the resin to be impregnated, the amount of the binder used is 10–400% by weight based on the weight of the catalyst and the amount of the solvent used is 10–100 times the weight of the catalyst.

EXAMPLE 4

This example illustrates an insulation for low voltage electric machines consisting mainly of a polyamide film.

A glass cloth tape and a polyamide (NOMEX) non-woven fabric tape were wound around a conductor a prescribed number of times. Then, 15 g of 2-phenylimidazole as a catalyst for the resin and 35 g of a novolac epoxy resin having a melting point of about 70° C. as a binder were mixed with 1 l of acetone to prepare a solution. Said winding was immersed in this catalyst treating solution for 30 minutes. After the immersion, the treated winding was dried at room temperature under reduced pressure, impregnated with a varnish obtained by mixing 1 equivalents of a bisphenol A epoxy compound with 2.5 equivalents of 4,4′-diphenylmethane diisocyanate, and then cured by heating. Thus, an insulated winding having very high thermal resistance was obtained.

Figure 5:
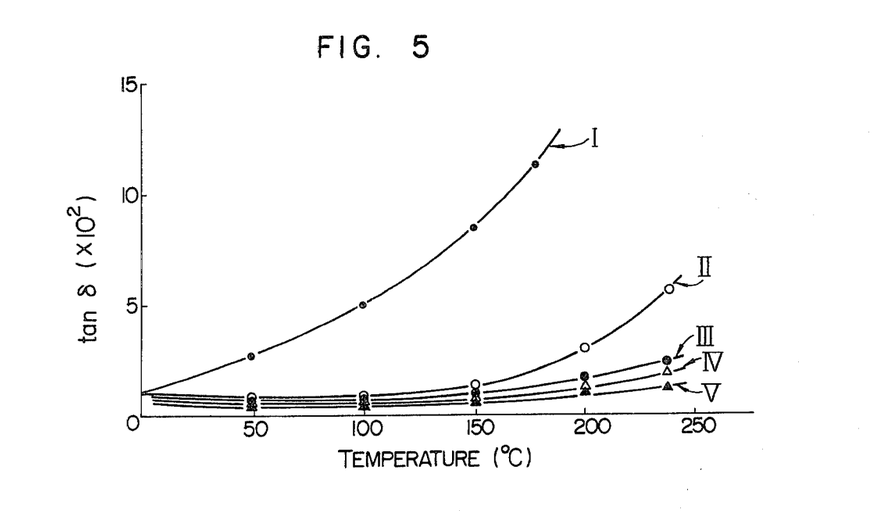
FIG. 5 shows a relationship between dielectric loss tangent and temperature in the insulating layer of a model coil.

As one example, relationship between dielectric loss tangent (tan δ) and a temperature showing the thermal resistance of the insulation is shown in FIG. 5. As is clear from FIG. 5, the winding insulated with the varnish used in the present invention (curve II) was remarkably superior to the winding insulated with a prior art epoxy resin (curve I) in thermal resistance.

In the same manner as mentioned above, three kinds of insulators having the equivalent ratios of polyisocyanate to polyepoxide of 5, 10 and 15 were prepared, and dielectric constants (tan δ, %) of the resulting insulators were determined. The results are shown in FIG. 5 in which curves III, IV and V show the insulators obtained from compositions of the equivalent ratio of 5, 10 and 15, respectively. According to FIG. 5, it is apparent that the insulators of the invention exhibit small dielectric constant over a wide range of temperature.

EXAMPLE 5

A small amount of fuchsine was added to the catalyst treating solution prepared in the same manner as in Example 4. The winding produced in the same manner as in Example 4 was immersed in the mixture for 30 minutes. After drying, the state and amount of the catalyst stuck to the tape were investigated. As a result, the dye was found to be stuck equally on the lowest tape contacting with the conductor and on the surface of the insulation, that is, on the upmost tape. Also, when the amount of the catalyst stuck to each layer was obtained from the weight, it was confirmed that the amount of the catalyst stuck varied according to the material of the tape but was almost equal for the same material. The results are shown in the following table:

TABLE 5

| Insulating layer | Material | Amount of catalyst stuck (g/m²) |
|---|---|---|
| 1st layer | Glass cloth | 6.2 |
| 2nd layer | Polyamide non-woven fabric | 5.1 |
| 3rd layer | Polyamide non-woven fabric | 5.0 |
| 4th layer | Polyamide non-woven fabric | 5.1 |
| 5th layer | Polyamide non-woven fabric | 5.3 |
| 6th layer | Glass cloth | 6.1 |

Thus, it was found that, according to the present invention, the catalyst penetrated into each layer of the insulation completely and was stuck to each layer uniformly.

What is claimed is:

1. A winding for electric rotating machines having a plurality of layers of a sheet-form insulating material having thermal resistance of at least class H wrapped around a conductor and a cured resin impregnated in said layers, said cured resin having recurring units represented by the formula, wherein R is a residue of a polyisocyanate, R′ is a residue of a polyepoxide, p is an integer of at least 2, and m and r are integers of at least 1, at least two isocyanurate rings directly bonded to one another through the residue of the polyisocyanate and the two oxazolidone rings directly bonded to each other through the residue of the polyepoxide.

2. An insulated winding for electric rotating machines according to claim 1, wherein said sheet-form insulating material having thermal resistance of at least class H is a glass fiber, a polyimide, polyamideimide or aromatic polyamide.

3. A process for producing an insulated winding for electric rotating machines which comprises wrapping a plurality of layers of a sheet-form insulating material having thermal resistance of at least class H around a winding conductor, impregnating the thus treated winding conductor with a varnish consisting essentially of (a) 1 equivalent of a polyepoxide compound containing at least two vicinal epoxy groups, and (b) more than one equivalent of an organic polyisocyanate, and then heating the impregnated winding conductor at a first temperature such that isocyanurate rings are formed by the trimerization of the polyisocyanate and then a second temperature such that oxazolidone rings are formed and cross-linking and curing occur to form and cure a resin having recurring units represented by the formula:

wherein R is a residue of the polyisocyanate, R' is a residue of the polyepoxide, p is an integer of at least 2, and m and r are integers of at least 1, at least two isocyanurate rings directly bonded to one another through the residue of the polyisocyanate and two oxazolidone rings directly bonded to each other through the residue of the polyepoxide in the insulating layers, in the presence of 0.01–10% by weight of a catalyst which forms an isocyanurate ring and an oxazolidone ring and is selected from the group consisting of imidazole and morpholine derivatives based on the total amount of the polyepoxide and the polyisocyanate.

4. A process according to claim 3, wherein said insulating material is of glass fiber, a polyimide, polyamideimide or aromatic polyamide.

5. A process according to claim 3, wherein said catalyst which forms an isocyanurate ring and an oxazolidone ring is an imidazole derivative.

6. A process for producing an insulated winding for electric rotating machines which comprises wrapping a plurality of layers of a sheet-form insulating material having thermal resistance of at least class H around a winding conductor, impregnating the thus treated winding conductor with a solution of a catalyst, for forming isocyanurate rings and oxazolidone rings and selected from the group consisting of imidazole and morpholine derivatives, dissolved in an organic solvent, until 0.01 to 10% by weight of the catalyst is held in the layers based on the total amount of a polyepoxide and an organic polyisocyanate as described below, removing the solvent, impregnating the treated winding with a varnish consisting essentially of (a) one equivalent of a polyepoxide containing at least two vicinal epoxy groups and (b) more than one equivalent of the organic polyisocyanate, and then heating the impregnated winding conductor at a first temperature such that isocyanurate rings formed by the trimerization of the polyisocyanate and then at a second temperature such that oxazolidone rings are formed and cross-linking and curing occur to form and cure a resin having recurring units represented by the formula:

wherein R is a residue of the polyisocyanate, R' is a residue of the polyepoxide, p is an integer of at least 2, and m and r are integers of at least 1, at least two isocyanurate rings directly bonded to one another through the residue of the polyisocyanate and two oxazolidone rings directly bonded to each other through the residue of the polyepoxide.

7. A process according to claim 6, wherein said sheet-form insulating material having thermal resistance of at least class H is glass fiber, a polyimide, polyamideimide or aromatic polyamide.

8. A process according to claim 6, wherein said catalyst which forms an isocyanurate ring and an oxazolidone ring is an imidazole derivative.

9. A process according to claim 3 or 6, wherein more than 2 equivalents of the polyisocyanate is used.

10. A process according to claim 9, wherein 5 to 10 equivalents of the polyisocyanate is used.

11. A process according to claim 3 or 6, wherein the heating is carried out at a first temperature of 60°–130° C. and then at a temperature of 150° C. or more.

12. A process according to claim 11, wherein the heating at a temperature of 60°–130° C. is carried out for 5–15 hours, and the heating at a temperature of 150° C. or more is carried out for 5–15 hours.

13. A process according to claim 12, wherein the catalyst is included in an amount of 0.1 to 2% by weight based on the total amount of the polyepoxide and the polyisocyanate.

14. Product formed by the process of claim 13.

15. The process of claim 12, wherein said catalyst is selected from the group consisting of N-dodecylmorpholine, butylene dimorpholine, hexamethylene dimorpholine, cyanoethyl morpholine, triazinoethyl morpholine, N-methyl morpholine, N-ethyl morpholine, 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 2,4-diamino-6-(2'-methylimidazolyl-1'-)-ethyl-s-triazine, and 2,4-diamino-6-(2'-undecylimidazolyl-1'-)-ethyl-s-triazine.

16. Product formed by the process of claim 15.

17. A process according to claim 11, wherein the catalyst is included in an amount of 0.1 to 2% by weight based on the total amount of the polyepoxide and the polyisocyanate.

18. Product formed by the process of claim 12.

19. The process of claim 3 or 6, wherein said catalyst is selected from the group consisting of N-dodecylmorpholine, butylene dimorpholine, hexamethylene dimorpholine, cyanoethyl morpholine, triazinoethyl morpholine, N-methyl morpholine, N-ethyl morpholine, 2- methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 2,4-diamino-6-(2'-methylimidazolyl-1'-)-ethyl-s-triazine, and 2,4-diamino-6-(2'-undecylimidazolyl-1'-)-ethyl-s-triazine.

20. A process according to claim 6, wherein the impregnating with said varnish takes place under reduced pressure.

21. A process according to claim 20, wherein the varnish has a viscosity of 7 poises or less during the impregnation.

22. A process according to claim 21, wherein the varnish has a viscosity of 2 poises or less during the impregnation.

23. Product formed by the process of claim 3 or 6.

* * * * *